(12) United States Patent
John et al.

(10) Patent No.: US 11,169,552 B2
(45) Date of Patent: Nov. 9, 2021

(54) SOLENOID INITIATOR WITH A MANUAL OVERRIDE FOR INFLATION SYSTEM

(71) Applicant: GOODRICH CORPORATION, Charlotte, NC (US)

(72) Inventors: Poly Puthur John, Kerala (IN); Nikhil Anthony Saldanha, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 17 days.

(21) Appl. No.: 16/785,940

(22) Filed: Feb. 10, 2020

(65) Prior Publication Data

US 2021/0181772 A1 Jun. 17, 2021

(30) Foreign Application Priority Data

Dec. 13, 2019 (IN) .............................. 201911051822

(51) Int. Cl.
*G05D 16/20* (2006.01)
(52) U.S. Cl.
CPC ................................ *G05D 16/2093* (2013.01)
(58) Field of Classification Search
CPC .................................................. G05D 16/2093
See application file for complete search history.

(56) References Cited

U.S. PATENT DOCUMENTS

| 3,016,920 | A | * | 1/1962 | Thomsen | ............ | F16K 31/0627 |
| | | | | | | 137/625.65 |
| 4,624,441 | A | * | 11/1986 | Kreitchman | .......... | F16K 31/406 |
| | | | | | | 244/100 A |
| 10,011,332 | B2 | | 7/2018 | Michalski | | |
| 2018/0231137 | A1 | | 8/2018 | John et al. | | |
| 2018/0341279 | A1 | | 11/2018 | John et al. | | |
| 2019/0249789 | A1 | | 8/2019 | John et al. | | |

\* cited by examiner

*Primary Examiner* — Eric Keasel
(74) *Attorney, Agent, or Firm* — Cantor Colburn LLP (57) ABSTRACT

A solenoid valve assembly with a manual override is provided that includes a solenoid valve housing that is supportive of a valve seat, a plunger-type armature valve element fluidly communicative with a fluid source and initially pressure balanced to remain in a closed position relative to the valve seat and an electromagnet configured to generate a magnetic flux to move the plunger-type armature-valve element into an open position relative to the valve seat. The solenoid valve assembly with a manual override also includes a manual actuation assembly configured to generate an applied force to move the plunger-type armature valve element into the open position relative to the valve seat.

18 Claims, 8 Drawing Sheets

SOLENOID INITIATOR WITH A MANUAL OVERRIDE FOR INFLATION SYSTEM

CROSS-REFERENCE TO RELATED APPLICATIONS

This application claims the benefit of Indian Patent Application number 201911051822 filed Dec. 13, 2019, which is incorporated herein by reference in its entirety.

BACKGROUND

The embodiments herein generally relate to inflation systems and more specifically, to a solenoid initiator with a manual override for inflation systems.

Pneumatic inflation systems often use stored high pressure gas sources to inflate an inflatable element. The stored high pressure gas sources are normally designed to be discharged within a specified time by the opening of an inflation valve that is normally-dosed. Some pneumatic inflation systems, such as those employed in helicopter life rafts and floats, make use of inflation valves that are actuated electrically using initiators with explosive materials. Such electrical initiators are commonly referred to as "electrical squibs" and each one typically includes a valve housing with a linear sliding-type valve element and an actuation housing with a piston seal assembly. An inlet of the inflation valve is connected to a high pressure gas bottle and the fluid pressure force is effective at the valve element. Energization of the electrical squib initiator causes an actuator piston to move in the actuator housing which in turn initiates an opening movement of the main valve element to discharge the high pressure gas from the stored gas bottle to the downstream inflatable.

Being elements of survival systems, inflation valves such as those described above do not tend to include or require any return forcing elements. That is, in the initial closed position, the valve elements of the inflation valves are retained by actuator piston rod assembled inside the actuation housing, but once the valve is opened by the electric squib initiator the opening position is sustained by the fluid inlet pressure force acting on the valve poppet. This leads to electrical squib initiators having certain disadvantages, such as being single shot devices having maintainability issues for the main valve and other safety compliance issues. Thus, solenoid based initiators are now commonly used instead to replace such squib based initiators.

Some of the current platforms' inflation systems use manually actuated inflation valves. Such manually actuated inflation valves can also be replaced with solenoid-based initiators. Such solenoid based initiators require an available electric supply, an interface between the main valve and the pilot solenoid valve and an electrical actuation logic. The proper functioning of such systems rely on the successful functioning of the solenoid initiator along with an electric drive switch.

BRIEF DESCRIPTION

According to one embodiment, a solenoid valve assembly with a manual override system is provided The solenoid valve assembly with a manual override includes: a solenoid valve housing that is supportive of a valve seat, a plunger-type armature valve element fluidly communicative with a fluid source and initially pressure balanced to remain in a closed position relative to the valve seat and an electromagnet configured to generate a magnetic flux to move the plunger-type armature-valve element into an open position relative to the valve seat. The solenoid valve assembly with a manual override also includes a manual actuation assembly configured to generate an applied force to move the plunger-type armature valve element into the open position relative to the valve seat.

In addition to one or more of the features described above, or as an alternative, further embodiments of the solenoid valve assembly with a manual override may include that the plunger-type armature-valve element includes: a body, a valve seal at a first end of the body to form a seal with the valve seat when the plunger-type armature-valve element is in the closed position, an armature configured to be responsive to the magnetic flux generated by the electromagnet at a second end of the body and a plunger rod extending from the second end of the body through a bore of the solenoid valve housing.

In addition to one or more of the features described above, or as an alternative, further embodiments of the solenoid valve assembly with a manual override may include that the manual actuation assembly includes: a cap attached to an end of the plunger rod that extends outside of the solenoid valve housing, a fulcrum base, a lever being configured to rotate about the fulcrum base and a pull cable attached to the lever that in response to an activation force being applied to the pull cable, causes an end of the lever to engage the cap to generate the applied force to the plunger rod that causes the plunger-type armature valve element to move into the open position.

In addition to one or more of the features described above, or as an alternative, further embodiments of the solenoid valve assembly with a manual override may include that the cap is an approximately U-shaped member including a first surface and a second surface on opposing sides of a recessed slot.

In addition to one or more of the features described above, or as an alternative, further embodiments of the solenoid valve assembly with a manual override may include that the lever further includes a resistive element that prevents rotation of the lever about the fulcrum base until a threshold level of force is applied to the pull cable.

In addition to one or more of the features described above, or as an alternative, further embodiments of the solenoid valve assembly with a manual override may include that the resistive element is a torsion spring.

In addition to one or more of the features described above, or as an alternative, further embodiments of the solenoid valve assembly with a manual override may include that when the plunger-type armature valve element is in the closed position the end of the lever is positioned in the recessed slot of the cap at a first distance away from the second surface of the cap.

In addition to one or more of the features described above, or as an alternative, further embodiments of the solenoid valve assembly with a manual override may include that in transitioning from the closed position to the open position, the plunger-type armature valve element moves a second distance, wherein the second distance is less than the first distance.

In addition to one or more of the features described above, or as an alternative, further embodiments of the solenoid valve assembly with a manual override may include a bellows. A first end of the bellows is attached to a collar extending from the plunger rod external to the solenoid valve housing and a second end of the bellows is attached to an external surface of the solenoid valve housing to create a seal around an opening in the solenoid valve housing through which the plunger rod passes.

In addition to one or more of the features described above, or as an alternative, further embodiments of the solenoid valve assembly with a manual override may include that an actuation force used to move the plunger-type armature-valve element into an open position exceeds a threshold force.

In addition to one or more of the features described above, or as an alternative, further embodiments of the solenoid valve assembly with a manual override may include that the threshold force includes a spring force of one or more elastic elements interfacing with the plunger-type armature valve element plus a fluid pressure force on a solenoid valve minus a fluid pressure force due to sealing of the bellows.

In addition to one or more of the features described above, or as an alternative, further embodiments of the solenoid valve assembly with a manual override may include that the threshold force further includes the addition of a torsion spring force caused by a torsion spring attached to the lever.

In addition to one or more of the features described above, or as an alternative, further embodiments of the solenoid valve assembly with a manual override may include In addition to one or more of the features described above, or as an alternative, further embodiments of the solenoid valve assembly with a manual override may further include a pneumatic rod seal, wherein the pneumatic rod seal is provided in an annular grove of the solenoid valve housing about a bore that receives a portion of the plunger rod.

In addition to one or more of the features described above, or as an alternative, further embodiments of the solenoid valve assembly with a manual override may include that the pneumatic rod seal comprises an O-ring seal.

In addition to one or more of the features described above, or as an alternative, further embodiments of the solenoid valve assembly with a manual override may include that the pneumatic rod seal isolates a solenoid inner cavity of the solenoid valve housing from external ambient air.

In addition to one or more of the features described above, or as an alternative, further embodiments of the solenoid valve assembly with a manual override may include that wherein an actuation force used to move the plunger-type armature-valve element into an open position exceeds a threshold force including a spring force of one or more elastic elements interfacing with the plunger-type armature valve element plus a fluid pressure force on a solenoid valve minus a fluid pressure force due to an O-ring seal.

According to another embodiment, a rapid inflation system is provided. The rapid inflation system including: a valve housing to which a fluid source and an inflatable are connected, an actuator housing coupled to the valve housing and configured when actuated to open a normally-closed valve element in the valve housing whereby pressurized fluid is permitted to flow from the fluid source to the inflatable, and a solenoid valve coupled to the actuator housing. The solenoid valve including: a valve seat, a plunger-type armature valve element fluidly communicative with the fluid source and normally pressure balanced to remain in a closed position relative to the valve seat, an electromagnet configured to generate magnetic flux when activated that moves the plunger-type armature-valve element into an open position relative to the valve seat such that at least a portion of the pressurized fluid flows into the actuator housing through the valve seat to actuate the actuator housing and a manual actuation assembly configured to generate an applied force to move the plunger-type armature valve element into the open position relative to the valve seat.

In addition to one or more of the features described above, or as an alternative, further embodiments of the rapid inflation system may include that the plunger-type armature-valve element includes: a body, a valve seal at a first end of the body to form a seal with the valve seat when the plunger-type armature-valve element is in the closed position, an armature configured to be responsive to the magnetic flux generated by the electromagnet at a second end of the body and a plunger rod extending from the second end of the body through a bore of the solenoid valve housing.

In addition to one or more of the features described above, or as an alternative, further embodiments of the rapid inflation system may include that the manual actuation assembly includes: a cap attached to an end of the plunger rod that extends outside of the solenoid valve housing, a fulcrum base and a pull cable attached to the lever that in response to an activation force being applied to the pull cable, causes an end of the lever to engage the cap to generate the applied force to the plunger rod that causes the plunger-type armature valve element to move into the open position.

In addition to one or more of the features described above, or as an alternative, further embodiments of the rapid inflation system may include that the cap comprises an approximately U-shaped member comprising a first internal surface and a second internal surface on either side of a recessed slot, Technical effects of embodiments of the present disclosure include a redundant actuation to open a solenoid valve for use in an inflation systems. Disclosed embodiments of the manual actuation assembly do not interfere with the conventional solenoid actuation to open the solenoid valve, allowing both options for actuating (i.e., opening) the solenoid valve to be used independently of one another.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As will be described below, a solenoid initiator with a manual override for inflation systems is provided, which allows for the manual actuation of the initiator to open a solenoid valve in the event of a failure of a component in the solenoid initiator that prevents electric actuation. For example, the manual override can be used to actuate the solenoid valve in the event that a part of the electric drive system or solenoid coil fails. The fast acting and non-explosive electrical initiator can be used repeatedly and provides for consistent and reliable performance to facilitate the maintenance of the inflation unit. In one embodiment, the electrical initiator includes a fast acting and normally-closed pneumatic plunger-type solenoid valve that is receptive of high pressure working fluid from an inlet of an inflation valve and employs electro-pneumatic action to admit pneumatic pressurized fluid into an actuator cavity of an inflation valve with electrical control. The manual actuation assembly is configured to operate independently from the solenoid's electrical actuation and does not interfere with normal operation of the solenoid's electrical actuation. As described in greater detail below, embodiments of the manual actuation assembly include a pull cable attached to a fulcrum lever that pivots about a fulcrum base to interact with a cap attached to the end of a plunger rod to push the plunger rod forward to draw a valve seal away from a valve seat to open the solenoid valve. The manual actuation assembly provides a redundant system that can be utilized in the event of the solenoid's electrical actuation failure.

Figure 1:
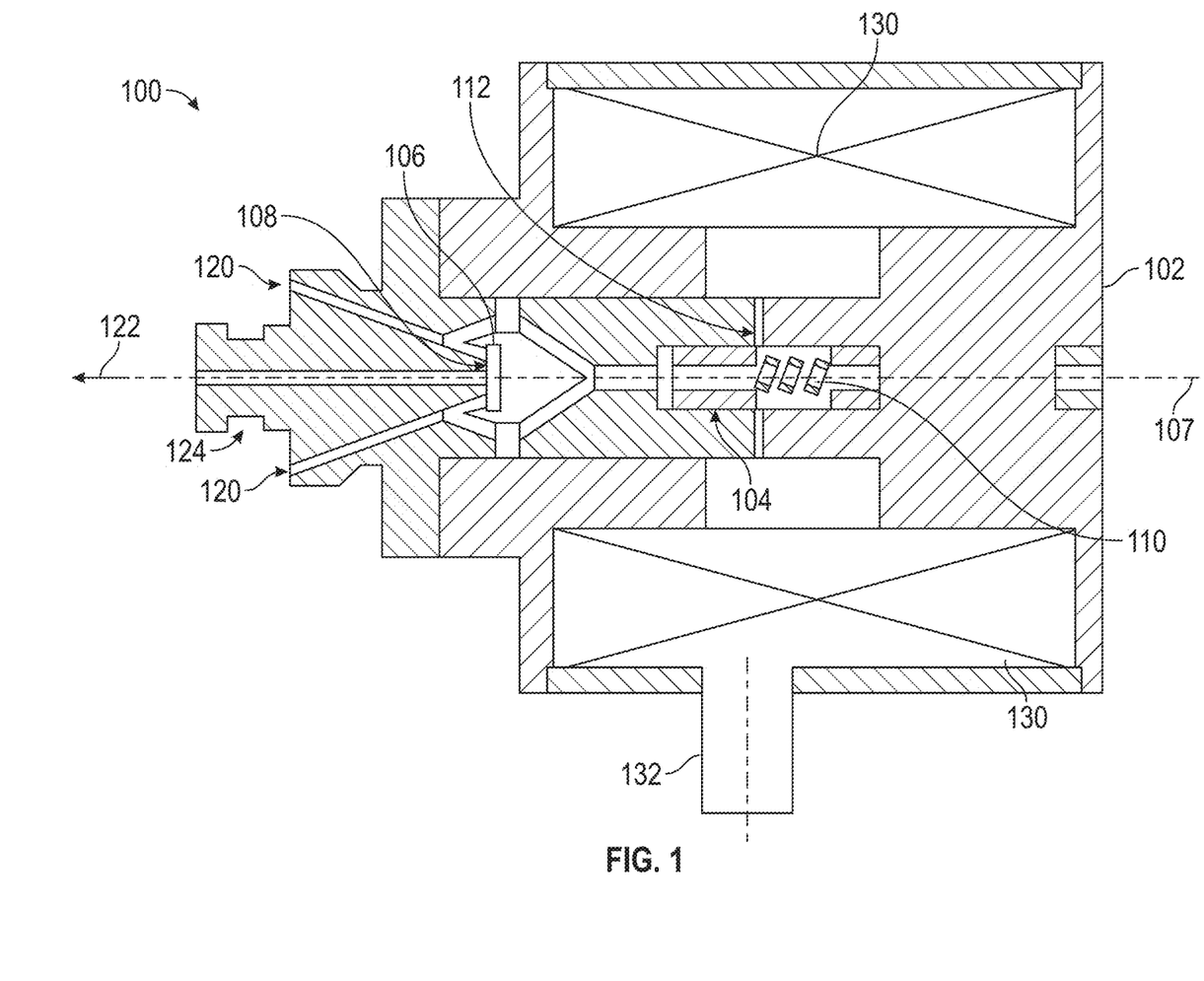
FIG. 1 is a schematic illustration of a cross-sectional side-view of a plunger type solenoid valve, according to embodiments of the present disclosure.
Figure 2:
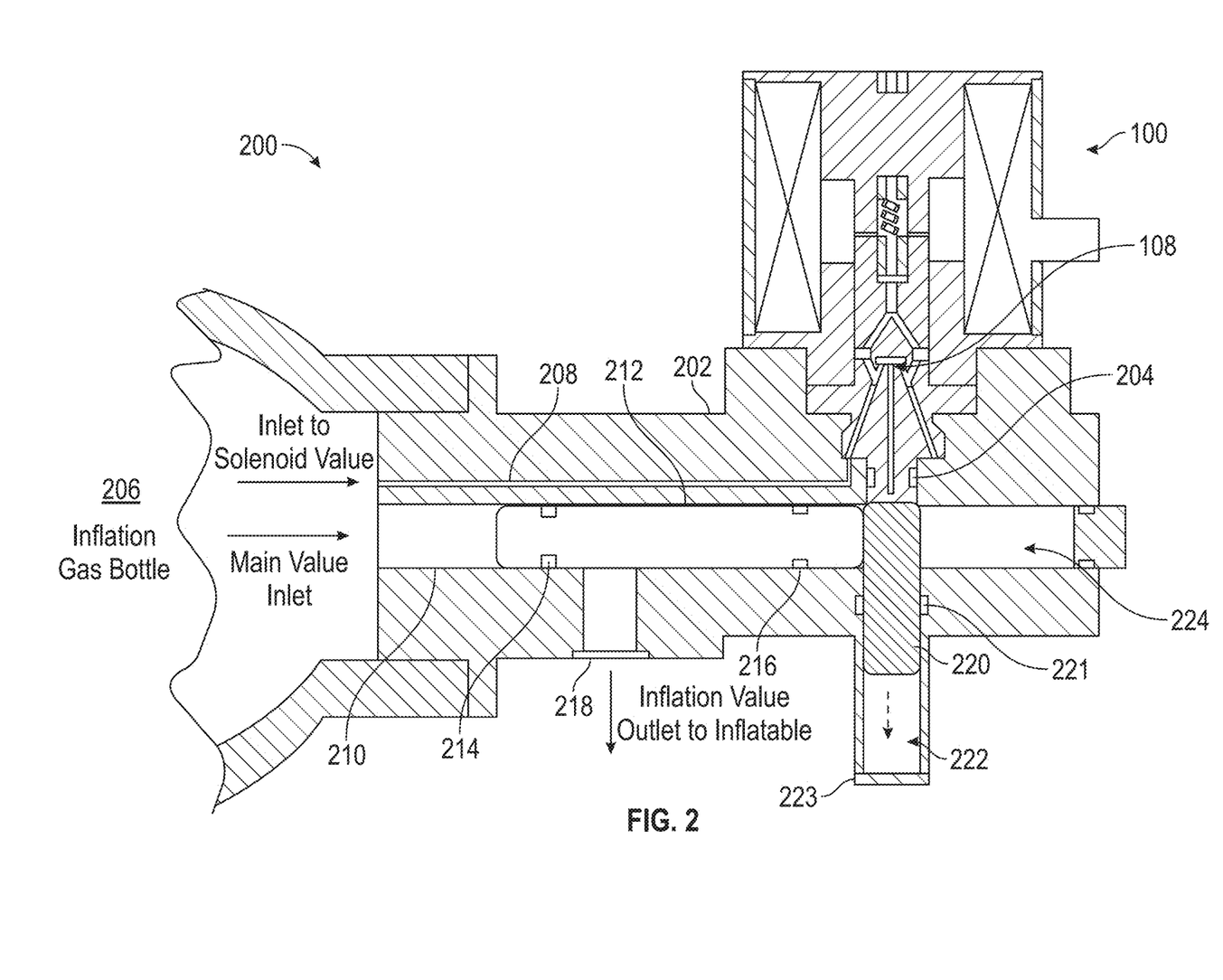
FIG. 2 is a schematic illustration of a cross-sectional side view of a solenoid operated inflation main valve, in accordance with embodiments of the present disclosure.
Figure 3A:
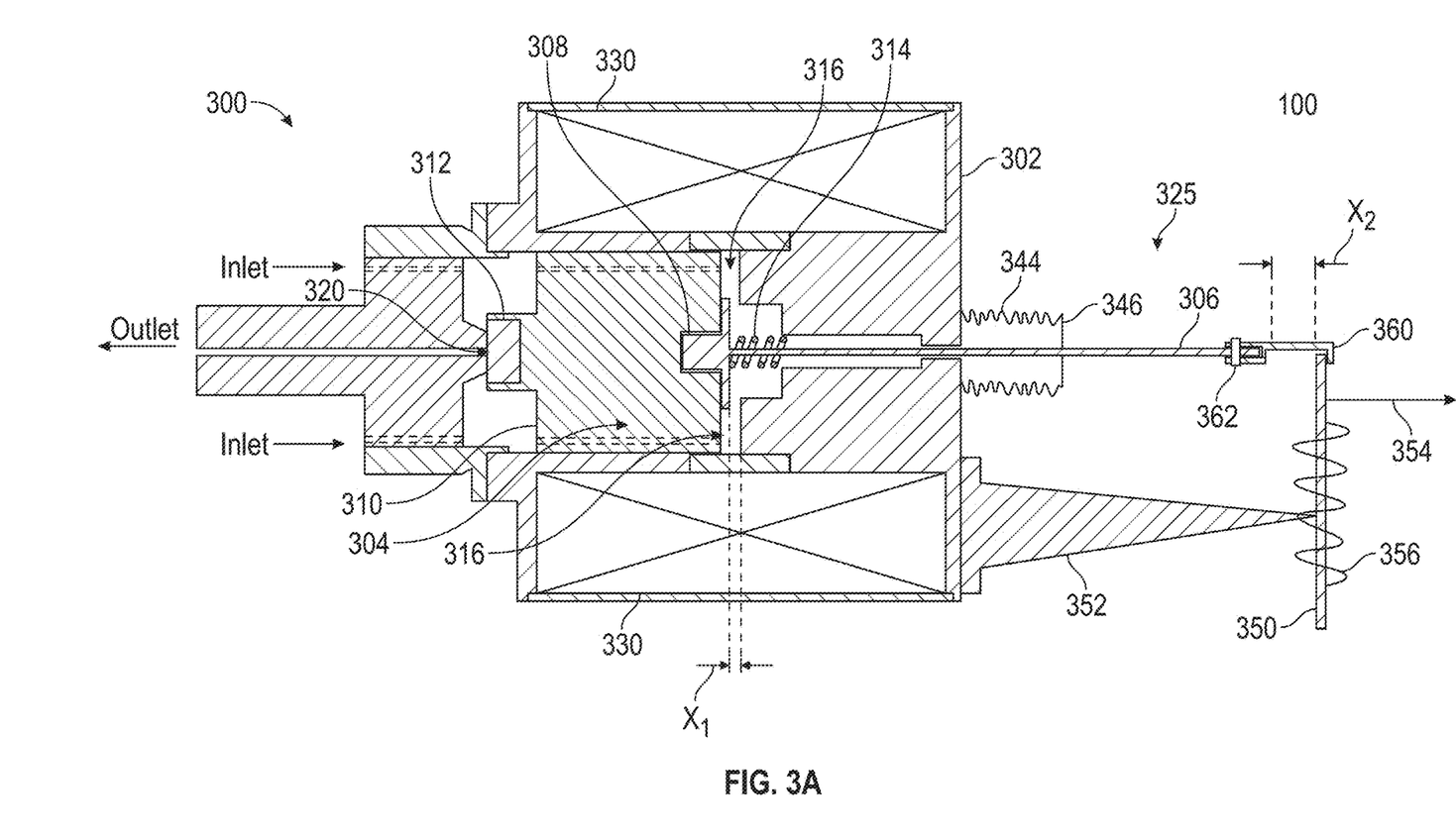
FIG. 3A is a schematic illustration of a cross-sectional side view of an example solenoid initiator with a manual override system for use in an inflation system in which the solenoid valve is in closed position, according to embodiments of the present disclosure.
Figure 3B:
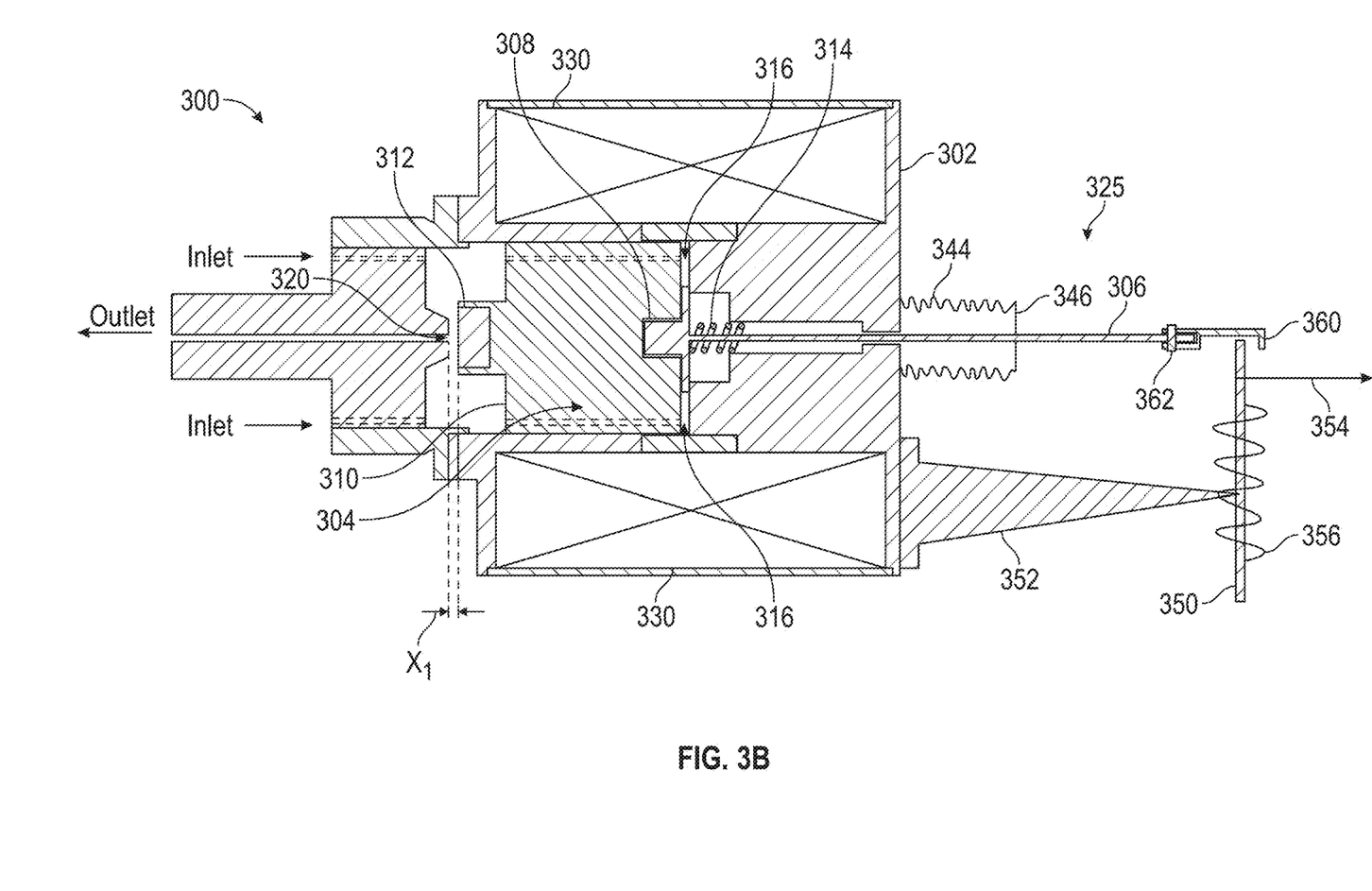
FIG. 3B is a schematic illustration of a cross-sectional side view of an example solenoid initiator with a manual override system for use in an inflation system in which the solenoid valve is in the open position based on electrical activation of the solenoid, according to embodiments of the present disclosure.
Figure 3C:
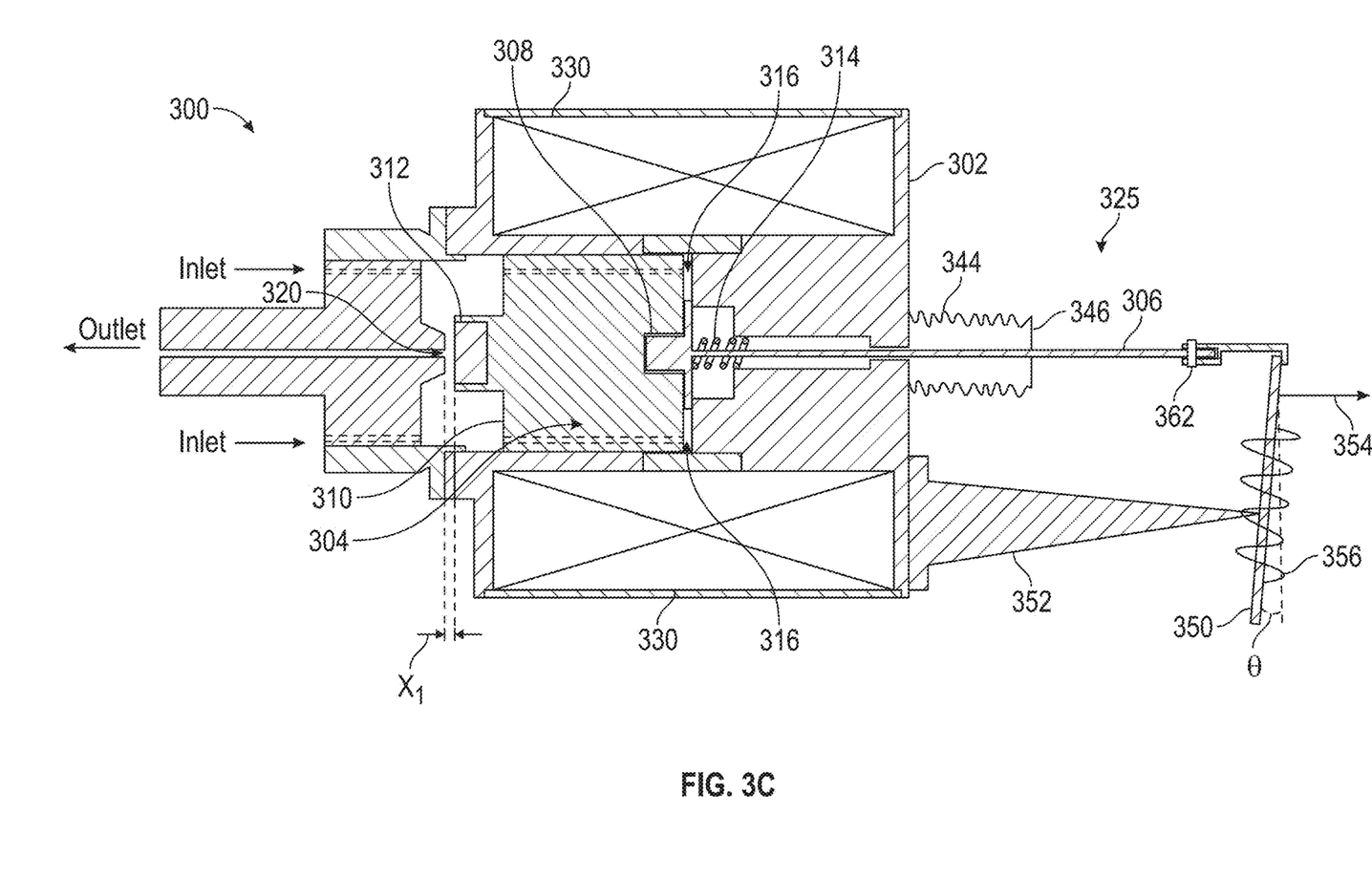
FIG. 3C is a schematic illustration of a cross-sectional side view of an example solenoid initiator with a manual override system for use in an inflation system in which the solenoid valve is in the open position based on an actuation of the manual override, according to embodiments of the present disclosure.
Figure 4A:
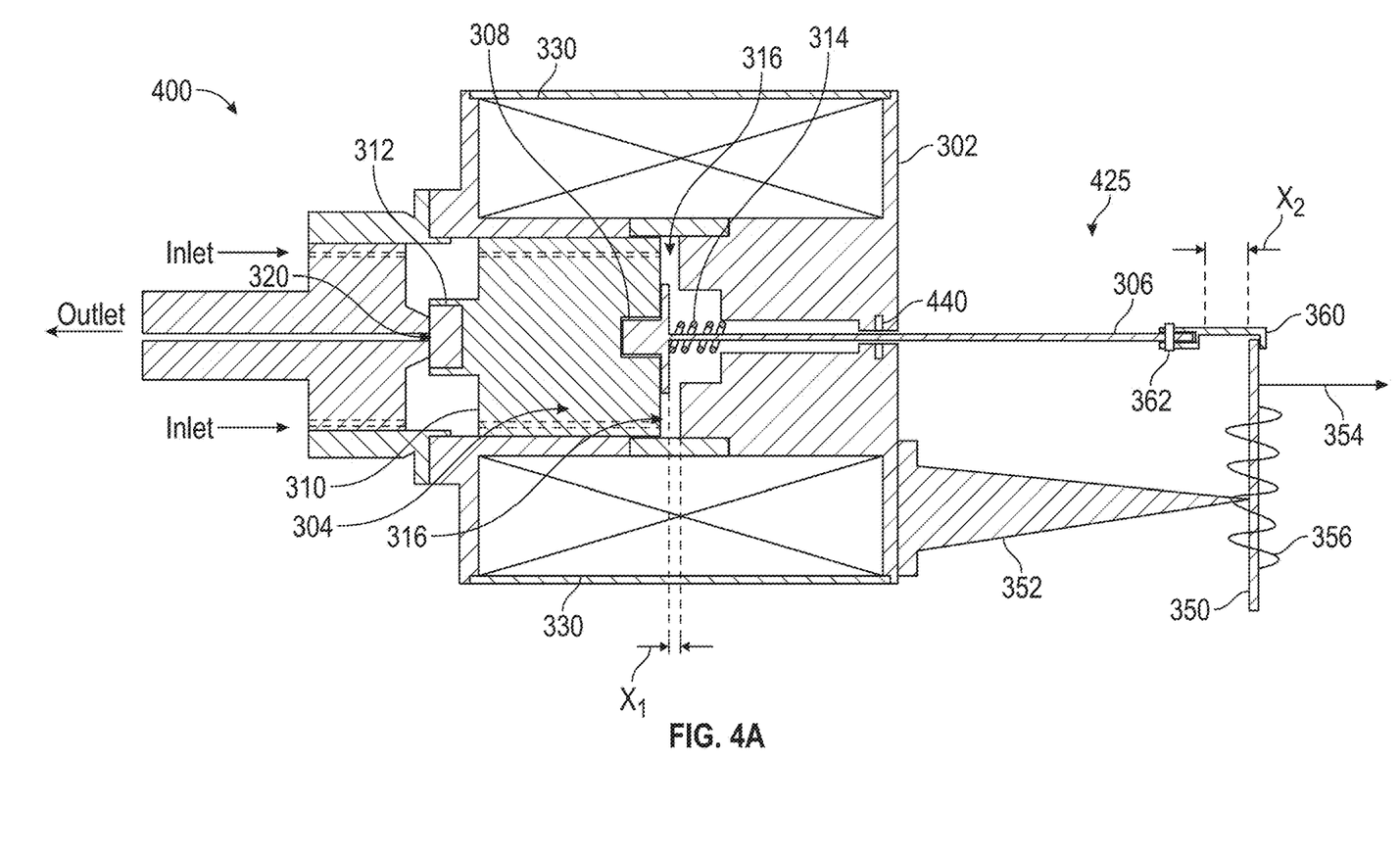
FIG. 4A is a schematic illustration of a cross-sectional side view of another example solenoid initiator with a manual override system for use in an inflation system in which the solenoid valve is in the closed position, according to embodiments of the present disclosure.
Figure 4B:
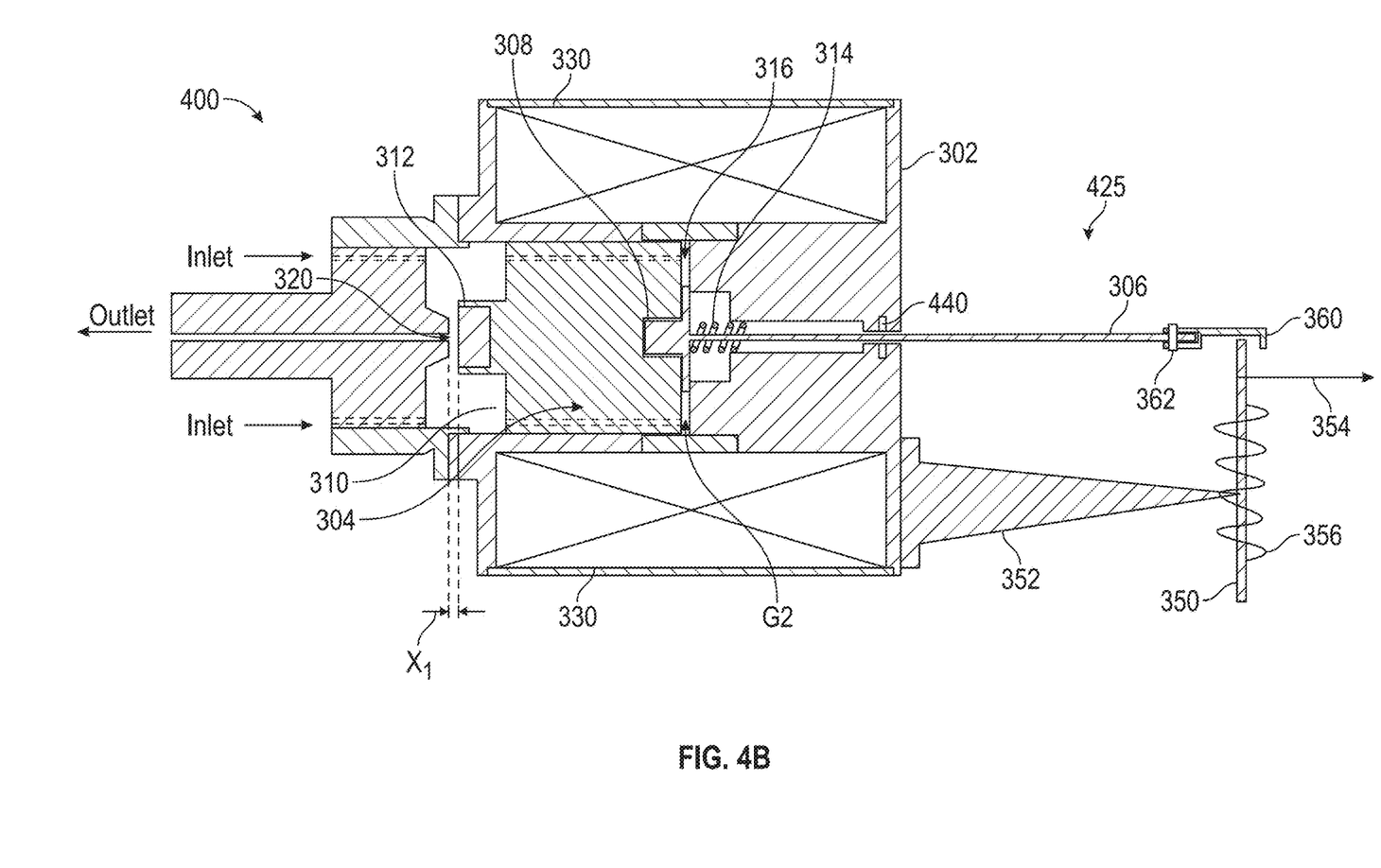
FIG. 4B is a schematic illustration of a cross-sectional side view of another example solenoid initiator with a manual override system for use in an inflation system in which the solenoid valve is in the open position based on electrical activation of the solenoid, according to embodiments of the present disclosure.
Figure 4C:
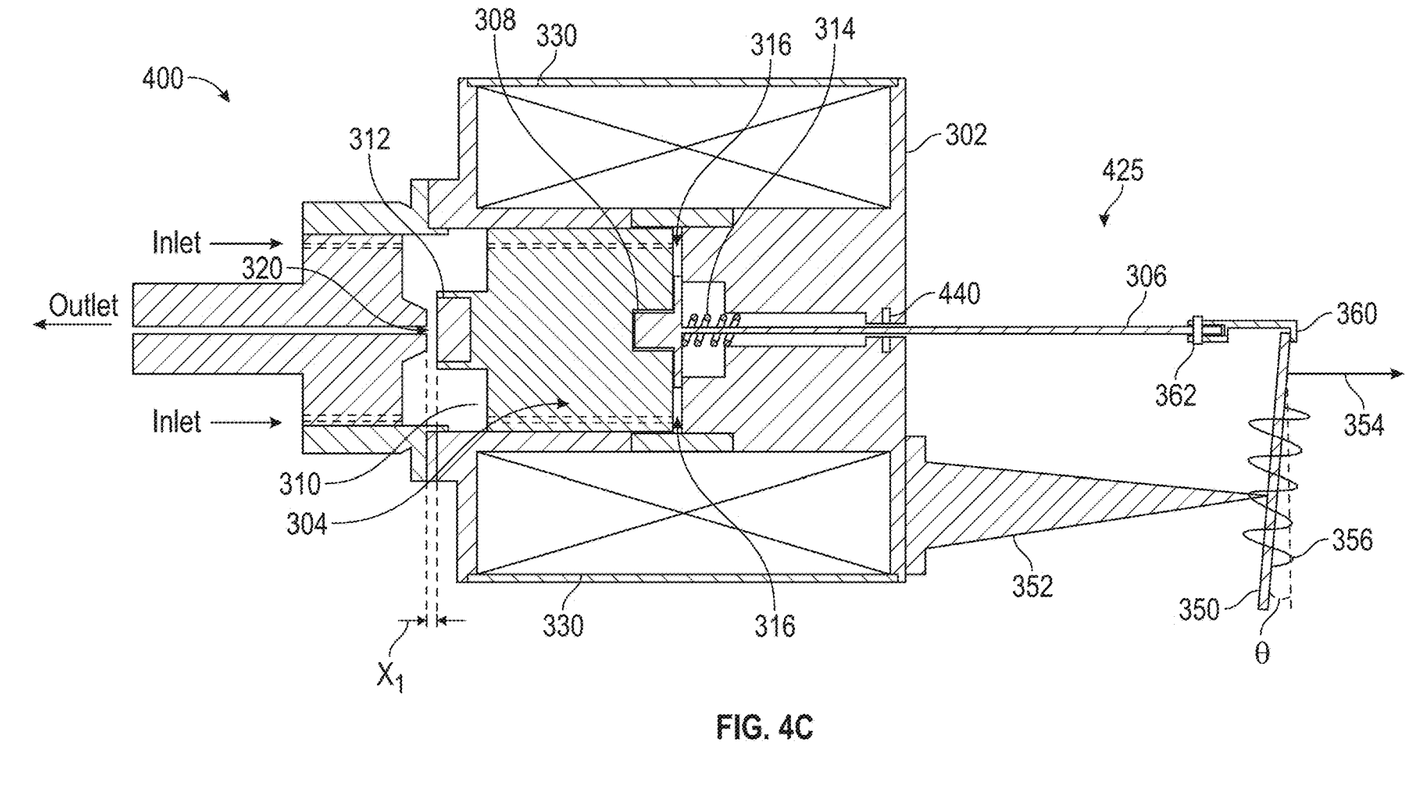
FIG. 4C is a schematic illustration of a cross-sectional side view of another example of a solenoid initiator with a manual override system for use in an inflation system in which the solenoid valve is in the open position based on an actuation of the manual override, according to embodiments of the present disclosure.

Referring to FIG. 1, an example embodiment of a plunger type solenoid valve 100 is provided. FIG. 2 shows an example embodiment of a solenoid operated inflation main valve 200 that incorporates the plunger type solenoid valve 100 of FIG. 1. FIGS. 3A-3C show cross-sectional schematic illustrations of a solenoid initiator with a manual override 300 that incorporates metallic bellows, according to embodiments of the present disclosure. FIGS. 4A-4C show cross-sectional schematic illustrations of a solenoid initiator with a manual override 400 that incorporates a dynamic pneumatic rod seal, according to embodiments of the present disclosure.

FIG. 1 shows an example embodiment of a plunger type solenoid valve 100 for use in an inflation system. The plunger type solenoid valve 100 includes a solenoid valve housing 102 formed as a cartridge interface that allows it to be integrated into a solenoid operated inflation main valve 200 as shown in FIG. 2. In some embodiments, the solenoid valve housing 102 can include a groove 124 for an O-ring that can be placed in the groove 124 when the solenoid valve 100 is integrated into the solenoid operated inflation main valve 200. As will be described in greater detail below, the actuation of the solenoid valve 100 can trigger an actuation of a main value to inflate an attached inflatable object (e.g., a raft, a life vest, etc.). The plunger type solenoid valve 100 includes a movable plunger 104 having a valve seal 106 that is positioned against a valve seat 108 when the solenoid valve is closed (as shown in FIG. 1). A compression spring 110 positioned on the plunger 104 can provide a spring force to the plunger 104 that is sufficient to keep the valve seal 106 pressed against the valve seat 108 until an actuating force is applied to the plunger 104 (e.g., via activation of the solenoid coil 130). The solenoid valve can be opened by moving the plunger 104 laterally along a predefined axis 107 a predefined distance sufficient to fill empty space defined by an air gap 112. In this position, the valve seal 106 will be removed from the valve seat 108, thereby unsealing openings to one or more inlets 120 and an outlet 122 to allow fluid or air to flow into the solenoid valve 100 from the inlet(s) 120 and out of the outlet 122 to actuate the main valve 200 as described further below. The plunger 104 includes an armature element that can cause the plunger 104 to move to open the solenoid valve 100 in response to an electromagnetic field generated by a solenoid coil 130 that is, for example, positioned within the solenoid valve housing 102 as shown in FIG. 1.

As will be understood by those of skill in the art, the solenoid coil 130 can be electrically activated to create an electromagnetic field that interfaces with an armature of the plunger 104 to cause the generation of an electromagnetic force that is sufficient to overcome the spring force of the compression spring 110 and cause the plunger 104 to move away from the valve seat 108 and open the solenoid valve. The solenoid valve housing 102 can include a lead wire extension cavity 132 to provide electric wiring to the solenoid coil 130 to provide current to the solenoid coil 130. Although not shown in the figures, it will be understood that the solenoid valve 100 can be connected to a controller and an actuated device (e.g., a button) that allows a user to actuate (i.e., cause to open) the solenoid valve 100 in response to a user actuation of the actuated device. According to some embodiments, upon actuation of the actuated device by a user, the controller will cause current to be supplied to the solenoid coil 130 (e.g., via a lead wire in the lead wire extension cavity 132), creating an electromagnetic force that interacts with an armature element of the plunger 104 to move the plunger 104 and open the solenoid valve 100. According to some embodiments, after the plunger 104 is moved to open the solenoid valve 100, the controller may cease the supply of current to the solenoid coil 130.

FIG. 2 shows a solenoid operated inflation main valve 200 having a main valve housing 202 that is integrated with the solenoid valve 100 described with respect to FIG. 1. According to some embodiments, the solenoid valve 100 can be thread assembled to main valve housing 202 and sealed with an O-ring 204 in the groove 124 of the solenoid valve 100. The O-ring 204 separates the fluid cavity of the inlet 120 of the solenoid valve 100 and an actuator cavity 222 of the main valve housing 202. As shown in FIG. 2, the main valve housing 202 includes an internal feed hole 208 that connects an inflation gas bottle 206 to the inlet 120 of the solenoid valve 100. According to some embodiments, a pressurized cylinder, canister or other suitable container can be used in place of a gas bottle 206. The inflation gas bottle 206 can house a pressurized gas or other fluid that fluidly communicates with the internal feed hole 208 to provide pressurized gas or other fluid to the inlet 120 of the solenoid valve 100. The main valve housing 202 also includes an inlet fluid cavity 210 that also fluidly communicates with the inflation gas bottle 206. The inlet fluid cavity 210 includes a movable valving element 212 that, when the main valve 200 is in a closed position, obstructs a fluid path to an inflation valve outlet 218 to an inflatable. Pressurized gas or other fluid provided from the inflation gas bottle 206 to the inlet fluid cavity 210 exerts a pressure force on the valving element 212 to force the valving element 212 towards an inflation valve cavity 224 disposed at the end of the inlet fluid cavity 210. The valving element 212 includes grooves that contain a first O-ring 214 and a second O-ring, respectively. According to some embodiments, the first O-ring 214 is larger than the second O-ring 216 such that the pressure force of the pressurized gas will always act to push the valving element 212 in the direction of the inflation valve cavity 224. However, when the main valve 200 is in a closed position, an actuator piston 220 positioned within a portion of the inlet fluid cavity 210 obstructs the valving element 112 and provides a resistive force that prevents the valving element 212 from moving into the inflation valve cavity 224. The actuator piston 220 is positioned within a channel of the main valve housing 202 that includes an empty space in an actuator cavity 222 that is sealed with a cap 223. The actuator piston 220 is provided with O-ring seal 221 that facilitates the development of a pressure force when the solenoid valve 100 is open. When the main valve 200 is in the closed position, the actuator piston 220 remains in a position that obstructs the valving element 212 from moving into the inflation valve cavity because of the static friction force at the interfacing region of valving element 212 and the actuator piston 220. This friction force increases in proportion to the pressure force acting on valving element 212. According to some embodiments, a compression spring can be provided inside the actuator cavity 222 to support the actuator piston 220 in this position.

As shown in FIG. 2, a top portion of the actuator piston 220 is positioned adjacent to the outlet 122 of the solenoid valve 100 such that when the solenoid valve 100 is open, gas or other fluid (originating from the inflation gas bottle 206 and flowing through the internal feed hole 208 and inlet 120) is ejected from the outlet 122 of the solenoid valve 100, pressurizing the actuator piston O-ring seal 221 and developing a pressure force that acts to push the actuator piston 220 into the empty space of the actuator cavity 222. Upon the actuator piston 220 moving into the actuator cavity 222, the actuator piston 220 will no longer obstruct the path to the inflation valve cavity 224, and the pressure force applied to the valving element 212 will cause the valving element 212 to move into the inflation valve cavity 224, thereby removing the obstruction to the inflation valve outlet 218. The pressurized gas or other fluid in the inflation gas bottle 206 can then freely flow out of the inflation valve outlet 218 to quickly inflate an attached inflatable object (not shown). Once the solenoid operated inflation main valve 200 is open (i.e., the path from the inflation gas bottle 206 to the inflation valve outlet 218 is unobstructed), the open position will be sustained by the pressure force acting on the first O-ring 214 seal and the second O-ring 216 seal and the solenoid valve 100 can be closed. In this way, actuation of the solenoid valve 100 can trigger a quick inflation of an inflatable object attached to the inflation valve outlet 218.

Turning now to FIGS. 3A-3C, cross-sectional schematic illustrations of a solenoid initiator with a manual override 300 (which may also be referred to as a plunger type solenoid valve with a manual override) are shown, according to some embodiments of the present disclosure. FIG. 3A shows the plunger 304 (which may alternatively be referred to as a plunger-type armature valve element) being a closed position relative to the valve seat 320, due to the valve seal 312 pressing against the valve seat 320. In some embodiments, the plunger 304 includes a valve seal 312 integrated with a plunger body 310 that is connected to a plunger rod 306 by being force fitted to the plunger end 308. The plunger body 310 can include an armature that electromagnetically interacts with the electromagnet 330 as described above. Electromagnet 330 may simply be referred to as a solenoid or solenoid coil and can correspond to the solenoid coil 130 of the solenoid valve 100 shown in FIG. 1. As will be appreciated, the embodiments of a solenoid initiator with a manual override shown in FIGS. 3A-4C and described herein can be of a cartridge type interface that is configured to be integrated with a solenoid operated inflation main valve, such as the solenoid operated inflation main valve 200 as shown in FIG. 2. Accordingly, elements of the disclosed solenoid initiator(s) with a manual override can integrate with a main valve (such as solenoid operated inflation main valve 200) in a manner similar to that described above with respect to the plunger type solenoid valve 100 shown in FIG. 1. As described in greater detail below, an end of the plunger rod 306 that extends outside of the solenoid valve housing 302 is attached to a cap 360. Thus, each of valve seal 312, the plunger body 310, the plunger end 308, the plunger rod 306 and the cap 360 (which may collectively be referred to as the plunger assembly) will move together in unison when the plunger 304 is moved from a closed position to an open position. The movement of plunger assembly can be guided by the guide faces (i.e., internal surfaces) provided in the solenoid valve housing 302.

As shown, a portion of the plunger rod 306 is contained within the solenoid valve housing 302 and another portion of the plunger rod 306 can be positioned outside of the solenoid valve housing 302. As will be understood, the plunger rod 306 can slide longitudinally along a bore of the solenoid valve housing 302 that terminates in an external opening of the solenoid valve housing 302 such that some portion of the plunger rod 306 can slide in and/or out of the solenoid valve housing 302 based on whether the plunger 304 is an open or closed position. In some embodiments, the plunger rod 306 can be made of a non-magnetic material. Further, in some embodiments, the plunger rod 306 can include a collar 346 that is connected to a bellows 344 that is connected to the collar 346 at a first end and is connected to an outer surface of the solenoid valve housing 302 at a second end. According to some embodiments, the collar 346 can be a planer member that fully encircles the circumference of the plunger rod 306. The collar 346 can be made of metal or any other suitable material. In some embodiments, the bellows 344 can be made of a metallic material and can be connected to the collar 346 and solenoid valve housing 302 via welding to ensure a zero leak assembly joint. The bellows 344 can deflect axially and act as a dynamic seal to isolate the solenoid inner cavity of the solenoid valve housing 302 from external ambient air, thereby not allowing the pressurized gas within the solenoid assembly from leaking to the atmosphere. According to some embodiments, the bellows 344 can be made of any material that is capable of withstanding the maximum operating fluid pressure being supplied from the pressure source feeding to the solenoid valve through the inlet ports. When the solenoid valve is closed, there exists a fluid pressure within the bellows 344 that acts to open the solenoid valve, thereby reducing the required closing force by virtue of this pressure force acting on the valve seal 312 and the spring force of the elastic elements 314. This causes a reduction of the net valve closing force and therefore a reduced solenoid actuation force is required to open the solenoid valve (i.e., to move the plunger 304 to an open position). Thus, the solenoid initiator with a manual override 400 can have an electromagnet 330 of a smaller size than otherwise necessary.

Prior to activation, the plunger 304 will be in an initially closed position due to the spring force from the elastic elements 314 (e.g., springs) and an unbalanced fluid pressure force acting at the valve seat 320, thereby maintaining the plunger assembly in the closed state and preventing charged gas from flowing from the inlet port to the outlet port. As will be understood by those of skill in the art, inside the solenoid valve cavity the fluid pressure force acting on the plunger 304 in radial directions are balanced, but the pressure force in axial directions are not fully balanced. On one side of the cavity a valve sealing is provided and the bellows 344 is provided on the other side. If the main sealing area is bigger, the effective pressure force is an unbalanced pressure force that is a closing force that provides the sealing stress to prevent leaks. As shown in FIG. 3A, the air gap 316 provides a maximum distance $X_1$ for the plunger body 310 to possibly travel before being stopped by an internal surface of the solenoid valve housing 302, when moving from a closed position to an open position.

According to some embodiments, the solenoid initiator with a manual override 400 includes a manual actuation assembly 325 that includes a lever 350 (e.g., a fulcrum lever), a fulcrum base 352, a pull cable 354, and a cap 360. As shown in FIG. 3A, the fulcrum base 352 is positioned on an external surface of the solenoid valve housing 302. The lever 350 is positioned such that it can pivot or rotate about the fulcrum base 352 (i.e., at the fulcrum point) in response to an application of an activation force, such as an appropriate pulling force applied to the pull cable 354. In some embodiments, the top of the fulcrum base 352 (proximate the lever 350) can include a small hole or notch that can serve as the fulcrum for the lever 350 (e.g., by inserting the lever 350 into the hole or into a notch). According to some embodiments, the height of the fulcrum base 352, the thickness of the lever 350 and length of the notch/slot in the plunger rod cap 360 can be selected such that the distance $X_2$ is greater than the distance $X_1$. This ensures that the solenoid actuation of the plunger assembly will not interfere with the manual actuation assembly 325. According to some embodiments, the lever 350 may not rotate if a force less than the activation force is applied to prevent an accidental activation of the manual override feature. In some embodiments, the lever 350 can include a resistive element, such as a resistive element 356 (e.g., a torsion spring), which creates an additional resistance force that must be overcome by the activation force in order to initiate the manual override feature. The resistive element 356 can prevent accidental actuation of the manual actuation assembly 425 during application of abusive loads or vibrations. According to some embodiments, the lever 350 can also include a hard stop (not shown) and the resistive element 356 can press the lever 350 against the hard stop to create the additional resistance force.

As shown in FIG. 3A, in some embodiments, the cap 360 can be an approximately U-shaped member having two internal surfaces separated by a recessed gap in the member (a "recessed slot"). In some embodiments, the cap 360 can be made of a metal material or any other suitable material. According to some embodiments, the cap 360 can be attached to the plunger rod 306 by a mechanical joint 362, such as for example but not limited to, a bolt and nut or a rivet joint. When the plunger 304 is in the closed position, an end of the lever 350 can be positioned in the recessed slot of the cap 360. In some embodiments, the end of the lever 350 can be touching a first internal surface of the cap 360 without applying force to it when the plunger 304 is in the closed position. In some embodiments, the end of the lever 350 can be positioned within the recessed slot without touching the first internal surface of the cap 360. In either case, the end of the lever 350 will be a distance $X_2$ (shown in FIG. 3A) away from the second internal surface of the cap 360. According to some embodiments, the distance $X_2$ is greater than the distance $X_1$ to prevent the second internal surface of the cap 360 from touching or otherwise interacting with the end of the lever 350 when the electromagnet 330 is actuated electrically. Thus, the solenoid initiator with a manual override 300 can be initiated using the solenoid/electromagnetic activation as described above without mechanical interference from the manual actuation assembly 325.

For example, FIG. 3B shows a depiction of the plunger 304 that has been moved from a closed to an open position in response to an activation of the electromagnet 330 (i.e., a solenoid initiation/activation), which causes an electromagnetic force to develop across the pole faces, which causes the solenoid plunger to move away from the valve seat 320 with sufficient force to overcome the valve's closing force (i.e., the spring force of elastic elements 314 and the unbalanced fluid pressure force). The movement of the plunger assembly compresses the elastic elements 314 and lifts the valve seal 312 from the valve seat 320 to allow charged gas to flow from the inlet to the outlet. In some embodiments, once the solenoid valve is open/activated, an actuator piston (e.g., actuator piston 220 of FIG. 2) of a main valve (e.g., solenoid operated inflation main valve 200 of FIG. 2) is caused to move, allowing the main valve to open to inflate an inflatable object. When electrical voltage to the electromagnet 330 is removed, the open position of the plunger 304 will be sustained due to the fluid pressure force developed within the bellow 344 when the plunger 304 is actuated from closed position to open position. As the inflation takes place, the fluid pressure reduces, which reduces the bellow pressure force keeping the solenoid valve in the open position and eventually the spring force of the elastic elements 314 will close the solenoid valve.

As shown, the valve seal 312, the plunger body 310, the plunger end 308, the plunger rod 306 and the cap 360 have all moved a distance of $X_1$ to open the valve by removing the valve seal 312 from the valve seat 320. Because the distance $X_1$ is less than the distance $X_2$, the cap 360 advantageously does not mechanically interact with the lever 350. Further, as shown by FIG. 3B, the bellows 344 span a greater distance when the plunger 304 is in the open position, but still maintain a seal around the opening of the solenoid valve housing 302 at which the plunger rod 306 exits to prevent the pressurized gas from escaping or leaking from the solenoid valve housing 302.

As shown by FIG. 3B, the solenoid initiator with a manual override 300 can utilize a solenoid initiator to open the solenoid valve (i.e., the opening to the outlet proximate the valve seat 320). However, in the event that the solenoid initiator electrically or electromagnetically fails, the solenoid initiator with a manual override 300 also provide for a manual activation to open the solenoid valve using the manual actuation assembly 325. As shown in FIG. 3C, the plunger 304 can be moved to the open position in response to an application of a manual activation force to the pull cable 354. For example, a user can manually pull on the pull cable 354 with sufficient force to exceed a threshold level of force, which corresponds to the required manual activation force. The amount of force needed to exceed a threshold level of force can be slightly less than the net closing force due to the mechanical advantage provided by the lever 350. According to some embodiments, the manual activation force can be a threshold force that is sufficient to overcome the valve's net closing force, the stiffness force of the bellows 344, solenoid spring 314 and any resistive force provided by a resistive element 356 (e.g., torsion spring). In some embodiments, the manual activation force can be a threshold force that is equal to the difference between the closing forces (e.g., spring force of elastic elements 314, the unbalanced fluid pressure force, and stiffness force of the bellow 344) (and if there is a tension spring 356, the resistive force due to the torsion spring 356 acting on the lever 350) and opening forces (e.g., bellows pressure force). In response to the application of the manual activation force to the pull cable 354, the pull cable 354 will cause the end of the lever 350 to engage with the first internal surface of the cap 360, creating an applied force sufficient to compress the elastic elements 314 and push the cap 360 away from the solenoid valve housing 302. As the cap 360 moves away from the solenoid valve housing 302, so too will the attached plunger rod 306, plunger end 308, plunger body 310 and valve seal 312 move, thereby lifting the valve seal 312 off the valve seat 320 and opening the solenoid valve and allowing fluid to flow to the outlet. As shown, the lever 350 will pivot about the fulcrum base 352 to a maximum angle of θ, which corresponds to the maximum distance $X_1$ traveled by the plunger 304.

According to some embodiments, the variables involved in the force balancing for electric actuation include:

Initial solenoid spring force in valve closing direction=$F_s$
Fluid pressure force in valve closing direction=$F_p$
Bellows effective area=$A_b$
Fluid pressure=$P_1$
Fluid pressure force due to bellow sealing, $F_b=A_b*P_1$
Bellow stiffness=$K_b$
Spring stiffness=$K_s$
Valve travel=$x_1$
Solenoid actuation force at operating voltage=Fa In the solenoid de-energized (closed) position, the net force keeping valve in closed position=$F_c=F_s+F_p-F_b$ In the solenoid energized position, the net forces keeping the valve in the open position=$F_o=F_a+F_b-(F_s+((K_b+K_s)*x))$.

Once the main valve is fully open and pressure is built at the outlet, the solenoid can be de-energized, which brings the force equation to $F_o=F_b-(F_s+((K_b+K_s)*x))$. At higher fluid pressure during the initial stages, sufficient opening force may exist and the solenoid valve may be sustained in the open position. This will not affect the functioning of the main pneumatic valve. Towards the end of inflation, fluid pressure is reduced and the fluid pressure of the bellows 344 $F_b$ reduces and the solenoid valve closes.

In both electrical and manual actuations, the solenoid valve opening will be ensured for a short duration during which the main valve is fully opened. Afterwards, whether the solenoid valve is opened or closed will not affect the operation of the main valve.

FIGS. 4A-4C show cross-sectional schematic illustrations of another solenoid initiator with a manual override 400 for use in an inflation system, according to embodiments of the present disclosure. As shown, the solenoid initiator with a manual override 400 has a manual actuation assembly 425 that is similar to the manual actuation assembly 325 shown in FIGS. 3A-3C, but that does not include the collar 346 or bellows 344 of the embodiment shown in FIGS. 3A-3C, but instead includes a pneumatic rod seal 440. According to some embodiments, pneumatic rod seal 440 can be an O-ring. As shown in FIG. 4A, in some embodiments, the pneumatic rod seal 440 is provided in an annular grove of the solenoid valve housing 302 about a bore that receives a portion of the plunger rod 306. The pneumatic rod seal 440 can isolate the solenoid inner cavity from external ambient air preventing pressurized fluid from escaping/leaking to the atmosphere.

FIG. 4B shows a depiction of the plunger 304 that has been moved from a closed to an open position in response to an electrical activation to the electromagnet 330 (i.e., a solenoid initiation/activation). Similar to the embodiment shown in FIG. 3B, FIG. 4B shows that the solenoid valve of the solenoid initiator with a manual override 400 can be opened via solenoid activation in a manner that is not interfered with by the presence of the manual actuation assembly 425. In other words, the lever 350 remains stationary when the solenoid initiator with a manual override 400 is electrically activated. The solenoid activation of the solenoid initiator with a manual override 400 operates in a similar manner to move the plunger 304 to the open position to that shown in FIG. 3B, except that instead of overcoming the solenoid valve's net closing force (i.e., the spring force of elastic elements 314 and the unbalanced fluid pressure force) and the stiffness force of the bellows 344, the solenoid activation force must overcome the solenoid valve's net closing force (i.e., the spring force of elastic elements 314 and the unbalanced fluid pressure force) and a friction force of the pneumatic rod seal 440. The force balancing features are generally the same as those previously described above, however in place of fluid pressure force due to bellows 344, $F_b$, the fluid pressure force due to the O-ring seal area $A_{or}$ (i.e., pneumatic rod seal 440) will be effective. Thus, fluid pressure force due to the O-ring seal is $F_{or}=P_1 \times A_{or}$. With respect to the solenoid initiator with a manual override 400, when the solenoid is in a de-energized position, the net forces keeping the solenoid valve in a closed position are $F_c=F_s+F_p-F_{or}$. When the solenoid is in the energized position, the net forces keeping the solenoid valve in an open position is $F_o=F_a+F_{or}-(F_s+K_s*x)$. Once the main valve is fully open and pressure if built at the outlet, the solenoid can be de-energized which brings the force equation to $F_o=F_{or}-(F_s+K_s*x)$.

FIG. 4C shows a depiction of plunger 304 that has been moved from a closed to an open position in response to a manual activation using the manual actuation assembly 425. The manual actuation assembly 325 operates in a similar manner to that described above with respect to FIG. 3C, however, instead of the manual activation force being used to overcome the solenoid valve's net closing force (i.e., the spring force of elastic elements 314 and the unbalanced fluid pressure force) and the stiffness force of the bellows 344, the manual activation force instead overcomes the solenoid valve's net closing force (i.e., the spring force of elastic elements 314 and the unbalanced fluid pressure force) and a friction force of the pneumatic rod seal 440. Thus, according to some embodiments, a threshold force required to manually activate the solenoid initiator with a manual override 400 using the manual actuation assembly 425 can be a minimum force needed to overcome the solenoid valve's net closing force, a friction force of the pneumatic rod seal 440 and any resistive force from the resistive element 356.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A solenoid valve assembly comprising:
  a solenoid valve housing comprising:
    a valve seat;
    an armature valve element fluidly communicative with a fluid source and initially in a closed position relative to the valve seat; and
    an electromagnet configured to generate a magnetic flux to move the armature-valve element into an open position relative to the valve seat; and
  a manual actuation assembly configured to generate an applied force to move the armature valve element into the open position relative to the valve seat, wherein the armature-valve element comprises a valve seal at a first end of the armature-valve element to form a seal with the valve seat when the armature-valve element is in the closed position; an armature configured to be responsive to the magnetic flux generated by the electromagnet at a second end of the armature-valve element; and a plunger rod extending from the second end of the armature-valve element through a bore of the solenoid valve housing, and the manual actuation assembly comprises a cap attached to an end of the plunger rod that extends outside of the solenoid valve housing; a fulcrum base; and a lever being configured to rotate about the fulcrum base.

2. The solenoid valve assembly of claim 1, wherein the manual actuation assembly comprises:
  a pull cable attached to the lever that in response to an activation force being applied to the pull cable, causes an end of the lever to engage the cap to generate the applied force to the plunger rod that causes the armature valve element to move into the open position.

3. The solenoid valve assembly of claim 2, wherein the cap comprises an approximately U-shaped member comprising a first surface and a second surface on opposing sides of a recessed slot.

4. The solenoid valve assembly of claim 3, wherein the lever further comprises a resistive element that prevents rotation of the lever about the fulcrum base until a threshold level of force is applied to the pull cable.

5. The solenoid valve assembly of claim 4, wherein the resistive element comprises a torsion spring.

6. The solenoid valve assembly with of claim 3, wherein when the plunger type armature valve element is in the closed position the end of the lever is positioned in the recessed slot of the cap at a first distance away from the second surface of the cap.

7. The solenoid valve assembly of claim 6, wherein in transitioning from the closed position to the open position, the armature valve element moves a second distance, wherein the second distance is less than the first distance.

8. The solenoid valve assembly of claim 3 further comprising a bellows, wherein a first end of the bellows is attached to a collar extending from the plunger rod external to the solenoid valve housing and a second end of the bellows is attached to an external surface of the solenoid valve housing to create a seal around an opening in the solenoid valve housing through which the plunger rod passes.

9. The solenoid valve assembly of claim 8, wherein an actuation force used to move the armature-valve element into an open position exceeds a threshold force.

10. The solenoid valve assembly of claim 9, wherein the threshold force comprises a spring force of one or more elastic elements interfacing with the armature valve element plus a fluid pressure force on a solenoid valve minus a fluid pressure force due to sealing of the bellows.

11. The solenoid valve assembly of claim 9, wherein the threshold force further comprises the addition of a torsion spring force caused by a torsion spring attached to the lever.

12. The solenoid valve assembly of claim 3 further comprising a pneumatic rod seal, wherein the pneumatic rod seal is provided in an annular grove of the solenoid valve housing about a bore that receives a portion of the plunger rod.

13. The solenoid valve assembly of claim 12 wherein the pneumatic rod seal comprises an O-ring seal.

14. The solenoid valve assembly of claim 13 wherein the pneumatic rod seal isolates a solenoid inner cavity of the solenoid valve housing from external ambient air.

15. The solenoid valve assembly of claim 13 wherein an actuation force used to move the armature-valve element into an open position exceeds a threshold force comprising a spring force of one or more elastic elements interfacing with the armature valve element plus a fluid pressure force on a solenoid valve minus a fluid pressure force due to an O-ring seal.

16. A rapid inflation system comprising:
  a valve housing to which a fluid source is connected;

an actuator housing coupled to the valve housing and configured when actuated to open a normally-closed valve element in the valve housing whereby pressurized fluid is permitted to flow from the fluid source to an inflation valve outlet of the valve housing; and a solenoid valve coupled to the actuator housing, the solenoid valve comprising:

a valve seat;

an armature valve element fluidly communicative with the fluid source and normally pressure balanced to remain in a closed position relative to the valve seat;

an electromagnet configured to generate magnetic flux when activated that moves the armature-valve element into an open position relative to the valve seat such that at least a portion of the pressurized fluid flows into the actuator housing through the valve seat to actuate the actuator housing; and a manual actuation assembly configured to generate an applied force to move the armature valve element into the open position relative to the valve seat, wherein the armature-valve element comprises a valve seal at a first end of the armature-valve element to form a seal with the valve seat when the armature-valve element is in the closed position; an armature configured to be responsive to the magnetic flux generated by the electromagnet at a second end of the armature-valve element; and a plunger rod extending from the second end of the armature-valve element through a bore of the solenoid valve housing, and the manual actuation assembly comprises a cap attached to an end of the plunger rod that extends outside of the solenoid valve housing; a fulcrum base; and a lever being configured to rotate about the fulcrum base.

17. The rapid inflation system of claim 16, wherein the manual actuation assembly comprises:

a pull cable attached to the lever that in response to an activation force being applied to the pull cable, causes an end of the lever to engage the cap to generate the applied force to the plunger rod that causes the armature valve element to move into the open position.

18. The rapid inflation system of claim 16, wherein the cap comprises an approximately U-shaped member comprising a first internal surface and a second internal surface on either side of a recessed slot.

* * * * *